(12) United States Patent
Poloni et al.

(10) Patent No.: US 11,421,616 B2
(45) Date of Patent: Aug. 23, 2022

(54) ONLINE MONITORING AND DIAGNOSTICS IN VEHICLE POWERTRAINS

(71) Applicant: Garrett Transportation I Inc., Torrance, CA (US)

(72) Inventors: Tomas Poloni, Malinovo (SK); Jaroslav Pekar, pACOV (CZ); Paul Dickinson, Bristol (GB)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 16/951,208

(22) Filed: Nov. 18, 2020

(65) Prior Publication Data

US 2022/0154659 A1 May 19, 2022

(51) Int. Cl.
| | |
|---|---|
| *B60T 7/12* | (2006.01) |
| *F02D 41/18* | (2006.01) |
| *F02B 1/06* | (2006.01) |
| *F02D 23/02* | (2006.01) |
| *F02D 41/00* | (2006.01) |

(52) U.S. Cl.
CPC .............. *F02D 41/182* (2013.01); *F02B 1/06* (2013.01); *F02D 23/02* (2013.01); *F02D 41/0007* (2013.01); *F02D 41/0072* (2013.01); *F02D 2200/0402* (2013.01); *F02D 2200/0406* (2013.01); *F02D 2200/0414* (2013.01)

(58) Field of Classification Search
CPC .... B60W 50/02; F02D 41/1495; F02D 41/22; F02D 2041/224; F02D 2041/227; F02D 2041/226; F02M 21/0293; F02M 2200/18
See application file for complete search history.

(56) References Cited

U.S. PATENT DOCUMENTS

| | | | |
|---|---|---|---|
| 9,670,858 B2 | 6/2017 | Yacoub | |
| 9,976,521 B1 | 5/2018 | Jentz et al. | |
| 10,019,854 B1 | 7/2018 | McQuillen et al. | |
| 10,184,439 B2 | 1/2019 | Claude et al. | |
| 10,364,764 B2 | 7/2019 | Wang et al. | |
| 10,619,582 B2 | 4/2020 | Lutz et al. | |
| 10,641,214 B2 | 5/2020 | Dudar | |
| 2005/0119819 A1* | 6/2005 | Stevens | F02D 41/28 701/104 |
| 2011/0173952 A1* | 7/2011 | Cassani | F02D 41/029 60/274 |
| 2017/0152826 A1* | 6/2017 | Claude | F02D 41/22 |

OTHER PUBLICATIONS

U.S. Appl. No. 17/008,076 and the entirety of the application filed Aug. 31, 2020.
Liu et al., "Modeling and Control of a Power-Split Hybrid Vehicle," IEEE Transaction on Control Systems Technology, vol. 16 (6), p. 1242-1251, Nov. 2008.
Extended European Search Report, EP 21202204.0, dated Apr. 4, 2022, 8 pages.

\* cited by examiner

*Primary Examiner* — John Kwon
(74) *Attorney, Agent, or Firm* — Seager, Tufte & Wickhem, LLP

(57) ABSTRACT

Methods and systems for calculating a plurality of aging factors in a system operating an engine. The calculated aging factors may include one or more of fuel injector drift, exhaust gas recirculation valve obstruction, and mass air flow sensor bias. Mass flow throughout the system, and pressures and temperatures within the system, are observed in an approach that relies on mass preservation concepts to estimate drift, obstruction and bias estimates.

20 Claims, 8 Drawing Sheets

ONLINE MONITORING AND DIAGNOSTICS IN VEHICLE POWERTRAINS

BACKGROUND

Many modern engines incorporate a number of environmental control mechanisms to limit emissions generation. With each added control mechanism, added complexity and potential failure modes arise. New and alternative monitoring and diagnostic analyses are desired.

OVERVIEW

The present inventors have recognized, among other things, that a problem to be solved is the need for new and/or alternative monitoring and diagnostic analyses are desired. In some examples, the system mass flow and models for such flow are used to extract and monitor aging factors such as, for example, fuel injector drift, exhaust gas recirculation valve obstruction, and/or mass air flow sensor bias.

A first illustrating and non-limiting example takes the form of a system comprising an engine comprising at least one cylinder, at least one fuel injector, an intake manifold and an exhaust manifold, wherein the at least one fuel injector is configured to inject a quantity of fuel to the cylinder, subject to fuel injector drift; an air intake comprising a mass air flow (MAF) sensor having an inlet and an outlet that generates a MAF sensor output subject to MAF sensor bias; a fuel-air mix (FAM) sensor having a FAM sensor output; a throttle positioned between the air intake and the engine intake manifold; an ambient pressure sensor and an ambient temperature sensor each having an output; a intake manifold (IM) pressure sensor and IM temperature sensor configured to sense pressure and temperature respectively at the intake manifold; and a system monitor configured to calculate each of the following using a model and the ambient pressure sensor and ambient temperature sensor outputs: a first pressure and a first temperature downstream of the MAF sensor; a second pressure and a second temperature at the exhaust manifold; a third pressure and a third temperature at the FAM sensor; a controller configured to calculate each of fuel injector drift and MAF sensor bias using the IM pressure and IM temperature, the MAF sensor output, the FAM sensor output, the fuel injector output, the first, second and third pressures, and the first, second, and third temperatures.

Additionally or alternatively, the system may further comprise a turbocharger having a turbine coupled to receive exhaust gas from the exhaust manifold and a compressor coupled to provide compressed air to the throttle; wherein the system monitor is configured to calculate the first pressure and first temperature upstream of the compressor.

Additionally or alternatively, the controller is further configured to: record a plurality of calculated fuel injector drift values, determine a rate of change of the fuel injector drift, and estimate and record a percentage of useful life remaining for the fuel injector.

Additionally or alternatively, the controller is further configured to: compare the calculated fuel injector drift to a threshold, and if the threshold is met, issue an alert for maintenance of the fuel injector.

Additionally or alternatively, the controller is further configured to: record a plurality of MAF sensor bias values, determine a rate of change of the MAF sensor bias, and estimate and record a percentage of useful life remaining for the MAF sensor.

Additionally or alternatively, the controller is further configured to: compare the calculated MAF sensor bias to a threshold, and if the threshold is met, issue an alert for maintenance of the MAF sensor.

Additionally or alternatively, the system may further comprise an exhaust gas recirculation (EGR) valve configured to recirculate air from the exhaust manifold back to the intake manifold, the EGR valve selectively operable between open and closed positions and subject to reduction of flow area (FEA), wherein the controller is further configured to estimate the FEA of the EGR valve using the IM pressure and IM temperature, the MAF sensor output, the FAM sensor output, the fuel injector output, the first, second and third pressures, and the first, second, and third temperatures.

Additionally or alternatively, the controller is further configured to: record a plurality of estimated FEA values, determine a rate of change of the FEA, and estimate and record a percentage of useful life remaining for the EGR valve.

Additionally or alternatively, the controller is further configured to: compare the estimated FEA to a threshold, and if the threshold is met, issue an alert for maintenance of the EGR valve.

Additionally or alternatively, the above described system may be incorporated into a hybrid electric vehicle which also includes and an electric motor, wherein the electric motor is controlled using a hybrid power split optimization routine, wherein the vehicle is configured to update the hybrid power split optimization routine using the estimated fuel injector drift.

A second illustrative and non-limiting example takes the form of a system comprising: an engine comprising at least one cylinder, at least one fuel injector, an intake manifold and an exhaust manifold, wherein the at least one fuel injector is configured to inject a quantity of fuel to the cylinder, subject to fuel injector drift; an air intake comprising a mass air flow (MAF) sensor having an inlet and an outlet that generates a MAF sensor output subject to MAF sensor bias; a fuel-air mix (FAM) sensor having a FAM sensor output; a high pressure exhaust gas recirculation (HPEGR) valve, having an input at the engine exhaust manifold and an output at the engine intake manifold, the HPEGR valve selectively operable between open and closed positions and subject to reduction of flow area (FEA_HPEGR); a throttle positioned between the air intake and the junction of the HPEGR and the engine intake manifold; a low pressure exhaust gas recirculation (LPEGR) valve, having an LPEGR input at the exhaust output and an LPEGR output coupled to the MAF sensor outlet, the LPEGR valve subject to reduction of flow area (FEA_LPEGR); an ambient pressure sensor and an ambient temperature sensor; a intake manifold (IM) pressure sensor and IM temperature sensor configured to sense pressure and temperature respectively at the intake manifold; a system monitor configured to calculate each of the following using a model: a first pressure and a first temperature downstream of the MAF sensor; a second pressure and a second temperature at the exhaust manifold; a third pressure and a third temperature at the FAM sensor; a controller configured to calculate each of the FEA_LPEGR, FEA_HPEGR, fuel injector drift, and MAF sensor bias using the IM pressure and IM temperature, the MAF sensor output, the FAM sensor output, the fuel injector output, the first, second and third pressures, and the first, second, and third temperatures.

Additionally or alternatively, the system may further include a turbocharger having a turbine coupled to receive exhaust gas from the exhaust manifold and a compressor coupled to provide compressed air to the throttle; wherein the system monitor is configured to calculate the first pressure and first temperature upstream of the compressor.

Additionally or alternatively, the controller is further configured to: record a plurality of calculated FEA_LPEGR values, determine a rate of change of the FEA_LPEGR, and estimate and record a percentage of useful life remaining for the LPEGR.

Additionally or alternatively, the controller is further configured to: compare the calculated FEA_LPEGR to a threshold, and if the threshold is met, issue an alert for maintenance of the LPEGR valve.

Additionally or alternatively, the controller is further configured to: record a plurality of calculated FEA_HPEGR values, determine a rate of change of the FEA_HPEGR, and estimate and record a percentage of useful life remaining for the HPEGR.

Additionally or alternatively, the controller is further configured to: compare the calculated FEA_HPEGR to a threshold, and if the threshold is met, issue an alert for maintenance of the HPEGR valve.

Further illustrative examples may include vehicles having incorporated therein the first or second illustrative, non-limiting examples (and variants thereof) and/or methods of operating systems as described in the first and second illustrative, non-limiting examples. A third illustrative, non-limiting example takes the form of a method of operating a system including an engine with an intake manifold, an exhaust manifold, and at least one fuel injector having an output subject to drift, the system also including a mas air flow (MAF) measurement device subject to drift and a fuel-air mix (FAM) measurement device; the method comprising: calculating a mass flow into the intake manifold, using an output of the MAF device; observing a ratio of fuel to air exiting the exhaust manifold using the FAM measurement device; determining an expected quantity of fuel from the fuel injector; determining a pressure in the intake manifold; using the ratio and the pressure, estimating the drift of the fuel injector; and using the ratio and the pressure, estimating the bias of the MAF device.

Additionally or alternatively, the method may be performed in a system further including an exhaust gas recirculation (EGR) valve having a factor of effective area (FEA) indicating a degree of obstruction of the EGR valve, the valve controlled by a control signal, the method further comprising: using the ratio, the pressure, and a value of the control signal of the EGR valve, estimating the FEA of the EGR valve.

Additionally or alternatively, the steps of estimating the drift of the fuel injector and estimating the bias of the MAF device further comprise using the value of the control signal of the EGR valve.

Additionally or alternatively, the method may further include determining that at least one of the estimated drift, bias, or FEA has crossed a threshold, and communicating a need for service of the system.

This overview is intended to provide an introduction to the subject matter of the present patent application. It is not intended to provide an exclusive or exhaustive explanation. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
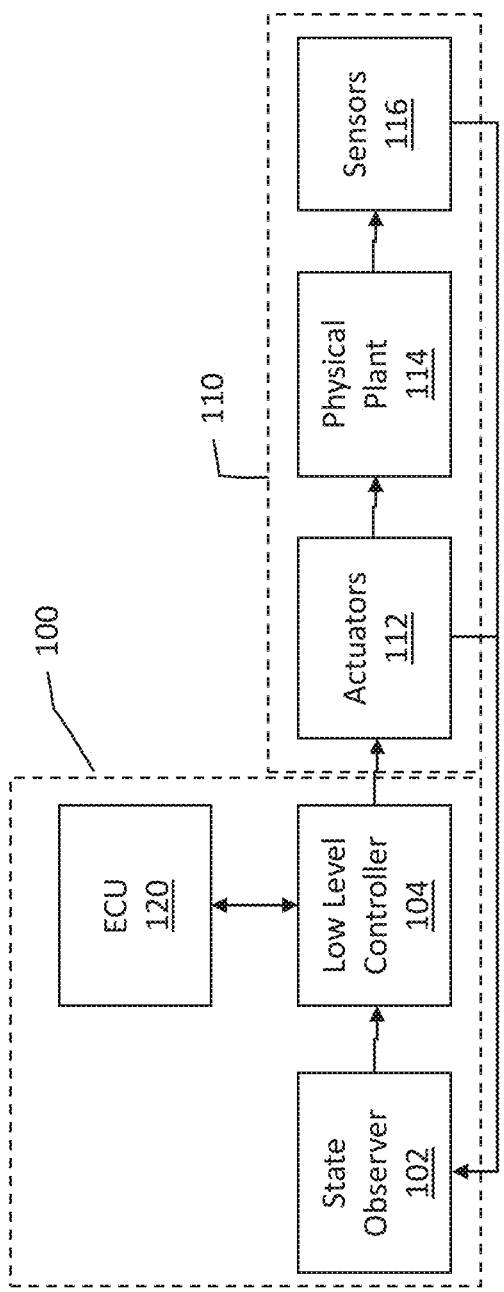
FIG. 1 shows a model of an operational control system.

FIG. 1 shows a model of an operational control system. A control apparatus is shown at 100 and includes a state observer 102, which feeds a set of current state variables to a low level controller 104. The low level controller 104 calculates a solution for process parameters that can be applied to a set of actuators 112, which in turn control operation of the physical plant 114. The physical plant 114 may be, for example and without limitation, an internal combustion engine, whether diesel or gasoline. The set of actuators 112 may control, for example and without limitation, fuel or other injectors, variable nozzle turbine position, engine brake, after-treatment (including exhaust), throttle position, exhaust gas recirculation (EGR) valve, an electric motor (in an electric turbocharger for example, which may be controlled via pulse width modulation (PWM)), waste gate (WG) position, charge air cooler functions, position of the recirculation valve, position of a variable compressor geometry actuator; and other valves, nozzles, and components in the system.

A plurality of sensors 116 are provided. Sensors 116 may include, for example, and without limitation, sensors detecting manifold absolute pressure (MAP), mass air flow (MAF), EGR pressure, flow and temperature, turbo speed, NOx, engine speed, fuel quantity, boost pressure, etc. Additional monitored parameters may include, for example, torque output of the electric motor of an electric turbocharger, waste gate (WG) normalized opening, recirculation valve (RCV) normalized opening, and/or a variable geometry compressor position and configuration. Sensors 116 may in some examples also sense user inputs, such as pressure on brake or acceleration pedals and/or steering wheel position (and changes to such). Sensors 116 may be configured to sample the underlying parameter being sensed and provide the result of such samples to the state observer 102. The state observer 102 may record the sensor outputs and actuator positions over time to provide history of the system operation.

The state observer 102 and low-level controller 104 may be, for example, implemented in a microcontroller configured to operate on a set of stored instructions for performing a state observation and optimization routine. In another example, an application specific integrated circuit (ASIC) may provide state observer functions, which can include the capture or accumulation of data from the actuators 112 and/or sensors 116, which in turn may be read periodically by a microcontroller. The low-level controller 104 may be configured with circuitry, logic, and/or stored instruction sets for performing a control and/or optimization calculation using, for example, model predictive control (MPC) cost functions, linear quadratic regulator (LQR) control, proportional integral derivative (PID) control, or other control methods.

The low-level controller 104 may be integrated into, or provided separately from, an on-board diagnostics system (not shown) that can be used to record diagnostic variables and present them, as needed to the user or to store for later analysis. The low-level controller 104 is shown operatively linked to the overall engine control unit (ECU) 120. Separate blocks 102, 104 and 120 are shown, however, it should be understood that this architecture may be integrated into a single processor or microcontroller, if desired. Additional blocks may be defined for some designs including for example a health monitor or environmental control monitor. In other examples, separate ASIC, state machine(s), microcontroller(s) or microprocessors may be provided for each block 102, 104 and 120, as desired. The various blocks shown may be operatively connected by electrical and/or communications couplings, including for example a controller area network bus.

The control solution calculated by the low-level controller 104 is used to generate one or more outputs, which in turn are used to control the actuators 112 to operate the physical plant 114. Generally speaking the aim may be to minimize the distance of operating variables from one or more target output values for the controllable outputs or physical plant operating characteristics. For example, the targets may be any of target turbocharger speed, target boost pressure, target pressure difference over the compressor, target air mass flow, target gas compositions, or a combination thereof. With MPC functions, the distance to target or reference values for the one or more output values (or resulting operating characteristics) is minimized, thus optimizing performance. As an example, an MPC cost function formation may be as shown in Equation 1:

$$J_{MPC} = \min \sum_{k=1}^{P} \|y_{r,k} - y_k\|_{W_1} + \|u_{d,k} - u_k\|_{W_2} \quad [\text{Eq. 1}]$$

Where $u_{d,k}$ corresponds to the desired profile for the manipulated variable, $u_k$ stands for the manipulated variable, k denotes discrete time instance, and P stands for the prediction horizon of the predictive controller. In this example, $y_{r,k}$ and $y_k$ represent the output reference and measured value, respectively, and $W_1$ and $W_2$ specify weighting terms. The MPC cost function is minimized in operation in order to provide optimal control to the physical plant, and the low-level controller 104 may use MPC accordingly.

In another example, a PID control method can be used to account for each of proportional, integral, and derivative differences from a target operating point. A target operating point for PID control may use a single value, such as compressor boost pressure, or may use a plurality of values such as compressor speed and compressor boost pressure, while controlling other factors (actuator positions, for example) to direct operations to maintain such target(s). The proportional difference may indicate current state, integral difference may identify a process shift over time, and derivative difference may indicate the direction of changes in operation. With PID control, a proportional difference is minimized while monitoring to ensure that the integral and derivative differences do not indicate changing performance which may, after further iterations, cause the proportional difference to increase. The control parameters output to the actuators 112 are, for a PID controller, adjusted to reduce or minimize the distance of actual performance from one or more targets on an iterative basis. PID control may incorporate multiple different target operating characteristics. The low-level controller 104 may use PID control instead of MPC, for example. LQR control may be used instead, if desired, applying similar concepts.

The state observer 102, low level controller 104, or ECU 120 may rely on an engine model that takes into account the different features of the engine to estimate temperatures and pressures at various locations in the engine. To facilitate the above mentioned control methods (PID, MPC and/or LQR), estimated pressures and temperatures can be generated and tracked over time, as well as projected into the future within a defined time horizon, using models that are developed and validated typically under well controlled conditions such as at a test station. Specific models will vary with specific engine builds, and the terminology may vary by manufacturer. However, generally speaking, the values for estimated pressures and temperatures are thus available for use in the illustrative methods discussed below. As used herein, a "system monitor" is whichever of the state observer 102, low level controller 104, or ECU 120 (or a separate controller, if provided) that tracks and models such inferred values.

Figure 2:
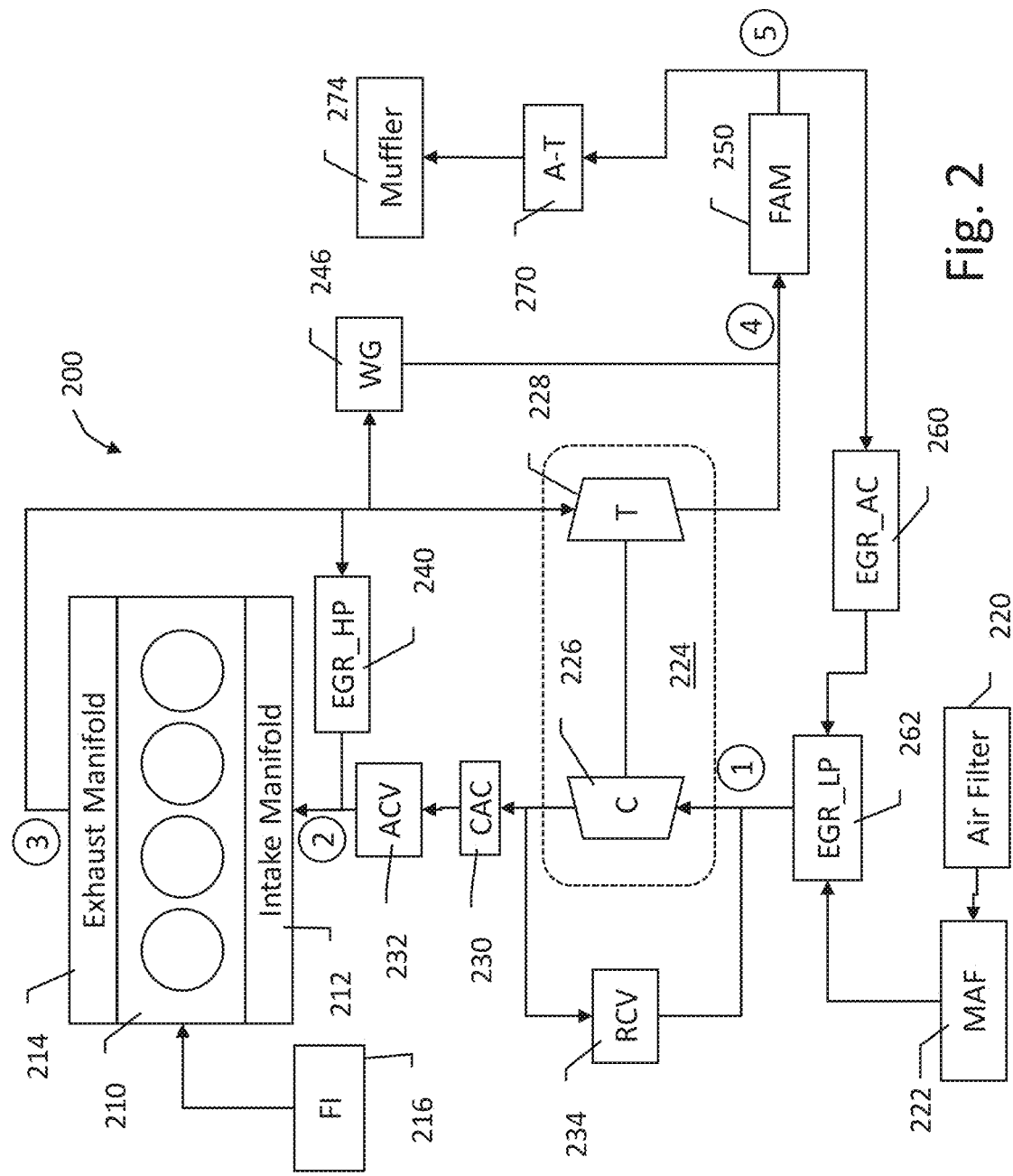
FIG. 2 shows an illustrative engine in schematic form.

FIG. 2 shows an illustrative engine in schematic form. The system 200 includes an engine 210 having an (air) intake manifold 212, and exhaust manifold 214 and a plurality of cylinders. The engine cylinders receive fuel input by fuel injectors 216. Each fuel injector 216 is adapted to provide a variable charge of fuel for each cycle of the cylinder (generally). The amount of fuel provided is determined by a control signal. The fuel injectors 216 age over time, and are subject to fuel injector drift, which reflects a change in the quantity of fuel delivered relative to that predicted by the control signal.

The air system of the engine system 200 is shown in some detail. Ambient air is received and filtered to remove particulates by an air filter 220, which is followed by a mass air flow (MAF) sensor 222. The MAF sensor 222 determines a mass flow entering the system. The measurement reported by the MAF sensor 222 is subject to bias, which is affected by component tolerance, aging and/or obstructions in the MAF sensor 222. For example, over time, particulates can accumulate in the MAF sensor and/or ageing of the MAF sensor can change its characteristics.

As used herein, when air passes through an element, the position before the air passes through the element is referred to as "upstream," and the position after the air passes through the element is referred to as "downstream." For example, as shown, air passes through the air filter 220 and then through the MAF sensor 222, therefore the air filter 220 is upstream of the MAF sensor 222, and the MAF sensor 222 is downstream of the air filter 220. Ambient air conditions may be sensed to determine, for example and without limitation, ambient air pressure, temperature and humidity.

In the example shown, the air passing through the MAF sensor 222 goes to a three way low-pressure EGR (EGR_LP) valve 262, further details of which are provided below. The air out of the EGR_LP valve 262 is fed to a turbocharger 224, which includes a compressor 226 and a turbine 228. Using torque obtained by the turbine 228, the compressor 226 will compress the air, raising the pressure and temperature thereof, which may also be referred to as charging the air. To enhance efficiency of the engine 210 (and limit temperature extremes) the air then passes through a charge air cooler (CAC) at 230. Downstream of the CAC 230 is an adjustable choke valve (ACV), shown at 232. The ACV 232 serves as the throttle in the system 200.

The system is shown as including a recirculation valve (RCV) 234, which allows charged air exiting the compressor 226 to recirculate back to the intake of the compressor 226. The RCV is included for various purposes, mainly to prevent surge that can arise when the ACV 232 (throttle) is closed with the compressor 226 spinning at high speed. A surge condition, if it arises, causes reverse flow of air through the compressor 226 and can damage the compressor 226 or other componentry. Some examples may omit the RCV 234, and its inclusion in the diagram is not limiting to this particular configuration. Using the ambient air conditions (temperature, pressure and/or humidity), the MAF sensor 222 output, the RCV 234 position, and the EGR_LP valve 262 position, the pressure and temperature at position 1, upstream of the compressor 226, can be modeled and will typically be tracked by the system monitor.

Air passing through the ACV 232 goes to the intake manifold 212. Another set of sensors, such as temperature and pressure sensors (or other sensors measuring constituents of the air, for example) may be provided at the intake manifold 212, marked as position 2, as shown. The air enters the cylinders of the engine 210, where combustion takes place. Following combustion, the air, now mixed with fuel (at least some of which has combusted) exits the engine at the exhaust manifold 214. Pressure and temperature at location 3, as shown can be modeled or inferred by the system monitor using the measured conditions at position 2 along with engine speed and fuel injection parameters, where the engine speed is measured by well-known magnetic measuring device, and fuel injection is obtained from the fuel injector 216 control signal.

The exhaust gasses from the exhaust manifold 214 are directed back to the turbocharger 224 and power the turbine 228. As the exhaust air passes through the turbine 228, the turbine spins and drives the compressor 226. The turbine 228 and/or compressor 226 of the turbocharger 224 may include variable geometries, if desired. For example, turbine 228 may to be a variable nozzle turbine (VNT). An electric motor (E-Turbo) may, optionally, be provided to enhance operation of the turbocharger 224, particularly at low engine speeds where the turbine 228 may not provide sufficient force to the drive the compressor 226 to sufficiently charge the airflow. In other embodiments the turbocharger 224 may be omitted, or it may be replaced with, or augmented by, a supercharger, if desired and as is known in the art.

A high-pressure exhaust gas recirculation system (EGR_HP) is provided as indicated at 240. The EGR_HP includes a controllable valve that allows recirculation of exhaust gasses back to the intake manifold 212. The use of an EGR, generally, is well known in the art as allowing the introduction of inert gasses into the combustion chamber of the engine. In the context of a diesel engine, EGR can be useful to reduce certain environmentally harmful emissions, particularly Nitrous Oxide (NOx). EGR may also be used in a gasoline engine to reduce throttling or pumping losses and/or engine knocking.

The area of flow through a valve may be scaled by the factor of effective area (FEA). Valves, such as the EGR_LP valve 262 and EGR_HP 240, are subject to occlusion over time and eventual blockage as particulate matter in the exhaust gasses accumulates reduce the area through which gasses can flow. FEA represents this reduction in the effective flow area. Accumulated material can also impair the ability of the valve actuator for either valve 240, 262 to move in response to electric command signals.

A wastegate (WG) is shown at 246. The WG 246 allows exhaust gasses to bypass the turbine 228 in some circumstances, such as to prevent overspeed of the turbocharger 224. The WG 246 is included for illustration purposes and may be omitted. For example, it is common to omit the WG 246 when a VNT is used as turbine 228. The speed of the turbocharger 224 can be measured, and using the turbine speed 228 and geometry, along with positions for EGR_HP and WG 246, the temperature and pressure at position 4, using as an addition input the temperature and pressure modeled at position 3.

A Fuel-Air Mix (FAM) sensor 250 is provided to sense conditions in the exhaust gas after exiting the turbine 228. The FAM sensor may include, for example and without limitation, a universal exhaust gas oxygen (UEGO) sensor, a Lambda sensor, and/or an oxygen sensor. The FAM sensor 250 in some examples is configured to output a measurement relative to an air-fuel equivalence ratio, usually denoted the symbol Lambda ($\lambda$) and measures the proportion of oxygen (O2) in the exhaust gasses. Pressure and/or temperature at position 5 may be modeled using the known geometry of the various system components and the pressure and temperatures calculated for position 4, among other data inputs.

The system as shown includes an after-treatment block, illustrated at 270. After treatment block 270 may include one or more exhaust treatment devices. For a diesel engine, for example, a selective catalytic reduction filter or Lean NOx Trap (LNT) device may be used to capture NOx emissions, other diesel oxidation catalyst (DOC) filters to capture hydrocarbon and carbon monoxide, and a Diesel Particulate Filter (DPF) may be used to capture particulate matter. A gasoline engine may include a catalytic converter, for example. In other examples, such as if the engine 210 is for use with other fuels, different exhaust treatment devices may be used. One or more additional sensors may be provided, such as temperature and/or pressure sensors, and any other desired sensors (such as emissions and/or particulate sensors), between the after-treatment block 270 to sense exhaust gasses before exiting via the muffler 274.

In the example of FIG. 2, a second EGR path is provided. An EGR_AC is shown at 260, and comprises a heat exchanger to cool recirculated gasses, before entry to a low pressure EGR (EGR_LP), shown at 262. The EGR_LP 262 is a valve controlled by an electric actuator. The EGR_LP 262 is subject to the accumulation of material therein, much like the EGR_LP 240 (though the gasses at this point in the system will have far less particulate matter, clogging can still arise). In this example, the EGR_LP 262 is a three-way valve that reduces fresh air intake as it increases exhaust gas recirculation, and vice-versa, as controlled by its actuator.

Figure 3:
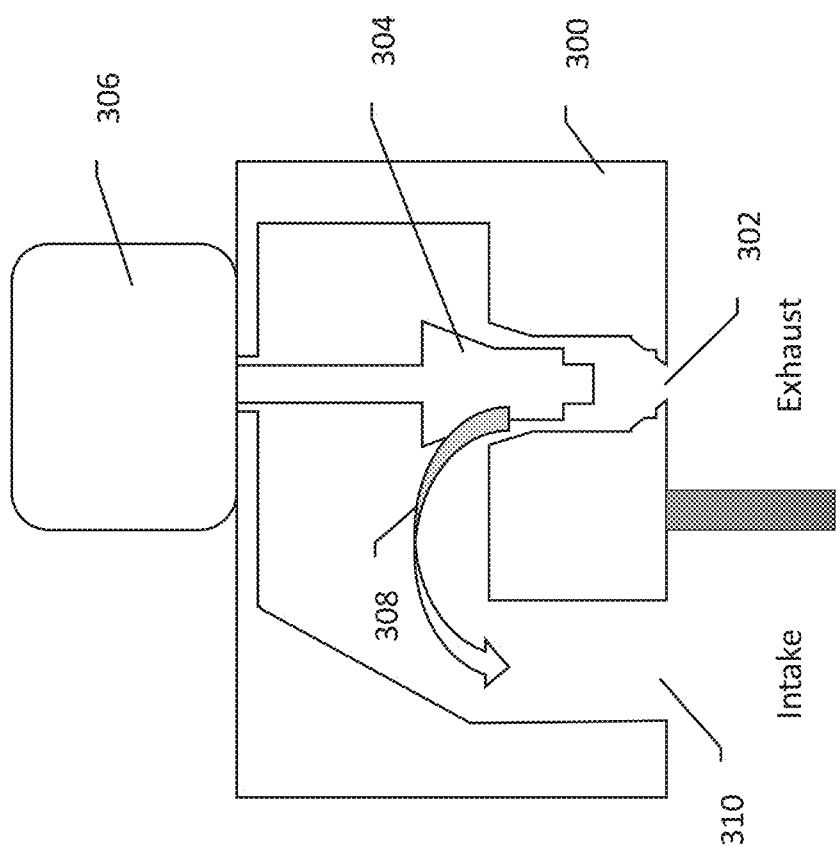
FIG. 3 shows an illustrative valve.

FIG. 3 shows an illustrative valve. The illustrative valve shown may be used anywhere in the system, though it is reflective of a common EGR valve design usable in either low pressure or high pressure positions such as shown above. Other valve designs, such as a butterfly valve, can also be used in such applications. A three-way valve may be used in some implementations, such as for the LP_EGR, as illustrated above in FIG. 2. For the example shown in FIG. 3, the valve housing 300 has an opening at 302 exposed to the exhaust gas stream. A plunger 304 is moveable up or down under the control of an actuator 306, allowing recirculation of exhaust gasses as shown at 308 to the system intake side through opening 310. The tendency is for obstructing material to accumulate around the plunger 304 and/or at the opening 302 exposed to the exhaust. Over time, the obstructing material reduces the available area for gas to flow, that is, the FEA is reduced, reducing flow even when the plunger 304 is retracted from the opening at 302.

For the valve shown in FIG. 3, or any other valve design, the passage of gas can be impeded by clogging or fouling over time. FEA for such devices indicates how much of the original flow area remains unobstructed. As a FEA decreases, the valve ceases to provide the desired degree of flow and/or may no longer actuate as commanded. In addition, the EGR flow model that the system control relies upon to determine EGR valve positions becomes biased. Eventually, the valve has to be cleaned or replaced. Thus, FEA is a useful variable to measure or otherwise determine for maintenance purposes.

Figure 4:
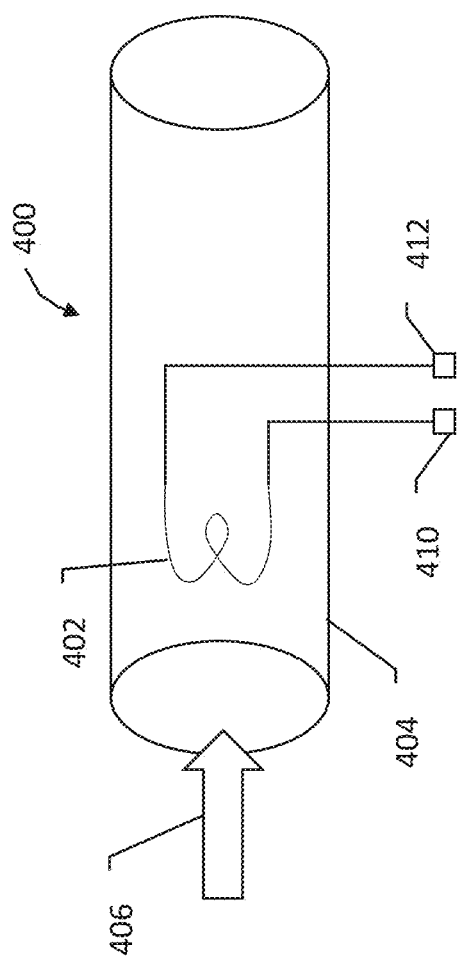
FIG. 4 shows an illustrative flow measurement device.

FIG. 4 shows a flow measurement device which can be used as a mass air flow (MAF) sensor. A tube 400 has within it a hot wire anemometer measurement device, with a filament 402 having current or voltage applied across from electrical connectors 410, 412. In an analog application, a Wheatstone bridge circuit may be coupled to the connectors 410, 412 to monitor changes in the resistance encountered by the electrical signal passed through the filament 402. Such changes reflect the mass of the gasses 406 flowing through the tube 400. Other flow measurement devices with other designs are also known, including, for example, flow obstructing measurement devices such as Venturi tubes, orifice plates and/or nozzle devices.

Referring again to the system in FIG. 2, several components are subject to aging over time. Aging factors that can affect system performance and necessitate maintenance may include MAF sensor bias, in which the measurements generated by the MAF sensor become inaccurate. Another aging factor is the FEA for each of the EGR valves, which affects mass flow relative to the expected flow as the opening through which gasses may flow becomes constricted. Still another aging factor is fuel injector drift, in which the actual quantity of fuel which is injected changes relative to an expected value. If these changes/biases are not detected and compensated, there may be a loss of system performance such as, for example, changes in emissions. Maintenance for each of these items may include any of cleaning, repair, or replacement.

At a system level, in an example, a system as shown above in FIG. 2 includes a plurality of available internal measurement devices for mass flow, temperature and pressure, and is generally sealed relative to the atmosphere except for intentional inputs and outputs as shown. The system may also be modeled by its manufacturer (or other person/entity) to allow pressures and temperatures to be estimated by inference and by reference to known actuator positions and other measurements. With the system sealed, mass flow into and out of the system must be equal. Absent leaks, the mass of air input that passes through the MAF sensor 222 plus the fuel input by the fuel injectors 216 must equal the mass exiting via the muffler 274. As noted, however, the MAF sensor 222 and the fuel injectors 216 are subject to bias and drift, respectively. Within the system, at least with respect to mass flow, there are at least two additional factors of high interest: FEA for each of the EGR valves 242, 262. An illustrative example combines analysis of these factors together, enabling a new and innovative analysis of several components allowing system maintenance, operation, and health to be optimized. More particularly, the following examples show how the available system measurement devices and modeling can be used to determine each of the MAF sensor drift, the fuel injector drift, and functional operation of the EGR valves.

The total mass flow into the engine at the intake manifold can be linked to the measured mass flow at the system air input and the EGR mass flow as $\{W_{ENG}=W_{MAF,c}+W_{EGR}\}$, where $W_{MAF,c}$ is the corrected MAF sensor flow. The corrected MAF sensor flow can be modeled as $\{W_{MAF,c}=W_{MAF}+b_A\}$, in which $W_{MAF}$ is the actual measured MAF, and $b_A$ is the MAF sensor bias. Regarding $W_{EGR}$, for those systems having two EGR valves, the value can be understood as $\{W_{EGR}=W_{EGR,1}+W_{EGR,2}\}$. In this formula and those that follow, for consistency the high pressure EGR valve is referenced as EGR,1 and the low pressure EGR valve is EGR,2.

Next, the difference between the total mass flow into the engine, $W_{ENG}$, and the MAF measurement, $W_{MAF}$, can be understood from Equation 2:

$$W_{ENG} - W_{MAF} = \frac{p_3}{\sqrt{RT_{HP}}} C_{v1} A_{v1}(\alpha_{v1}) \Psi\left(\frac{p_2}{p_3}\right) + \frac{p_5}{\sqrt{RT_{LP}}} C_{v2} A_{v2}(\alpha_{v2}) \Psi\left(\frac{p_1}{p_5}\right) + b_A \quad [\text{Eq. 2}]$$

Where:
$p_1$ is a modeled pressure at location 1 (compressor input) as shown in FIG. 2;
$p_2$ is a measured pressure at location 2 (intake manifold) as shown in FIG. 2;
$p_3$ is a modeled pressure at location 3 (exhaust manifold) as shown in FIG. 2;
$p_5$ is a modeled pressure at location 5 (post-FAM sensor) as shown in FIG. 2;
$C_{v1}$ is the FEA estimate for EGR_HP and $C_{v2}$ is the FEA estimate for EGR_LP;
$A_{v1}$ is the valve opening area as a function of valve command for EGR_HP;
$A_{v2}$ is the valve opening area as a function of valve command for EGR_HP;
The function $\psi$ is the nonlinear flow function for each EGR valve (in equation 1, a single $\psi$ function is referenced; if the two valves are of differing geometry/design, there may be two separate functions, $\psi_1$ and $\psi_2$);
$T_{HP}$ and $T_{LP}$ are modeled temperatures downstream of EGR_HP and EGR_LP, respectively; and
R is the specific gas constant.

In context, the FEA estimates, $C_{v1}$ and $C_{v2}$ can be rated to a range of 0 to 1, with 1 indicating a clean or new valve, and 0 indicating complete occlusion, such that as each degrades, the amount of mass flow through each valve is reduced in the above equation.

The rate of mass flow at the engine intake manifold couples the EGR_HP flow to that of the throttle (ACV 232 in FIG. 2), and can be understood from Equation 3:

$$(ACV)W_{THR}=W_{ENG}-W_{EGR1} \quad [\text{Eq. 3}]$$

The rate of change of intake manifold pressure can then be calculated from the mass flows as illustrated in Equation 4:

$$\dot{p}_2 = \frac{R\kappa}{V_i}(W_{THR}T_{THR} - W_{ENG}T_{ENG} - W_{EGR,1}T_{HP}) \quad [\text{Eq. 4}]$$

Where κ is the isentropic exponent of air, $V_i$ is the intake manifold volume, $T_{ENG}$ is the measured temperature at the intake manifold, and $T_{THR}$ is the modeled temperature at the throttle.

In addition to the mass flow into the engine from the combined throttle and high pressure EGR, the fuel injectors add further mass input by injecting a quantity of fuel in each cylinder. Downstream of the engine, in the exhaust, the FAM sensor (250 in FIG. 2) provides a measure of the mass ratios in the exhaust gas escaping the system. The output of the fuel injectors is subject to drift, $b_F$. Equation 5 ties the system output to the system input:

$$W_{MAF} = \lambda(t) L_{th}(W_F + b_F) - b_A \qquad [\text{Eq. 5}]$$

Where $\lambda(t)$ is the FAM sensor's measurement of the air-fuel ratio, $W_F$ is the uncorrected mass flow of fuel, and $L_{th}$ is the stochiometric constant. The $\lambda(t)$ term provides a scaled output of air-to-fuel ratio by mass, and the inclusion of $L_{th}$ (and/or one or more additional constants) is used here to normalize the output in terms of the determined air mass. That is, knowing the air-fuel ratio, multiplying by the fuel input, gives the air input assuming an otherwise closed system, with two drift terms included in the formula.

Taking the above equations together, a configuration of an extended Kalman filter (EKF) discrete time dynamic can be built using the standard EKF approach to discrete time dynamics—that is, in discrete math, $x_{k+1} = f_k(x_k, u_k, z_k)$, yielding the following set of equations:

$$P_{2,k+1} = P_{2,k} + \frac{T_s R_k}{V_i}\left[ W_{ENG,k}[T_{THR,k} - T_{ENG,k}] - \underbrace{\frac{p_{3,k}}{\sqrt{RT_{HP,k}}} C_{v1,k} A_{v1,k}(\alpha_{v1,k}) \Psi_k\!\left(\frac{p_{2,k}}{p_{3,k}}\right)}_{W_{EGR,1,k}}[T_{HP,k} - T_{THR,k}] \right] + z_{1,k}, \qquad [\text{Eq. 6}]$$

$$b_{A,k+1} = b_{A,k} + z_{2,k} \qquad [\text{Eq. 7}]$$

$$C_{v1,k+1} = C_{v1,k} + z_{3,k} \qquad [\text{Eq. 8}]$$

$$C_{v2,k+1} = C_{v2,k} + z_{4,k} \qquad [\text{Eq. 9}]$$

$$b_{F,k+1} = b_{F,k} + z_{5,k} \qquad [\text{Eq. 10}]$$

And the state vector can be defined as:

$$x_k = [p_{2,k}, b_{A,k}, C_{v1,k}, C_{v2,k}, b_{F,k}]^T \qquad [\text{Eq. 11}]$$

Two flow models, each providing a measure of MAF sensor bias, fuel injection drift, and EGR FEA, and one measurement pressure model result:

$$y_{1,k} = \frac{p_{3,k}}{\sqrt{RT_{HP,k}}} C_{v1,k} A_{v1,k}(\alpha_{v1,k}) \Psi_k\!\left(\frac{p_{2,k}}{p_{3,k}}\right) + \frac{p_{5,k}}{\sqrt{RT_{LP,k}}} C_{v2,k} A_{v2,k}(\alpha_{v2,k}) \Psi_k\!\left(\frac{p_{1,k}}{p_{5,k}}\right) + b_{A,k} + v_{1,k}, \qquad [\text{Eq. 12}]$$

$$y_{2,k} = p_{2,k} + v_{2,k} \qquad [\text{Eq. 13}]$$

$$y_{3,k} = \lambda_k L_{th}(W_{F,k} + b_{F,k}) - b_{A,k} + v_3 \qquad [\text{Eq. 14}]$$

Here, $y_{1,k}$ is the total (raw or uncorrected) EGR flow model, $y_{2,k}$ is the intake manifold pressure model, and $y_{3,k}$ is the mass air flow model for the MAF sensor. As a result, using the limited set of inputs, the measured MAF into the system, knowledge of prior estimates of the two EGR FEA, and the two EGR valve positions, each of the current MAF Sensor Bias, Fuel Injector Drift, and EGR FEA can be calculated.

The above example includes inputs and analytics for a system having both an EGR_HP and an EGR_LP. Some examples may omit one or the other of the EGR flow paths. As an example, a diesel engine may omit the LP_EGR, while a gasoline engine may omit the HP_EGR. In other examples, both EGR valve paths can be included in gasoline, diesel, or other fuel engines. If so, the above equations apply in the same way, except that the EGR mass flow for whichever path is omitted is replaced by zero.

Once calculated, one or more of these values can then be recorded in the on-board memory and/or communicated from the vehicle to an external database, such as a central repository of information for a fleet of vehicles or a manufacturer's database. Various decisions can also be made, as shown in FIGS. 5-8.

Figure 5:
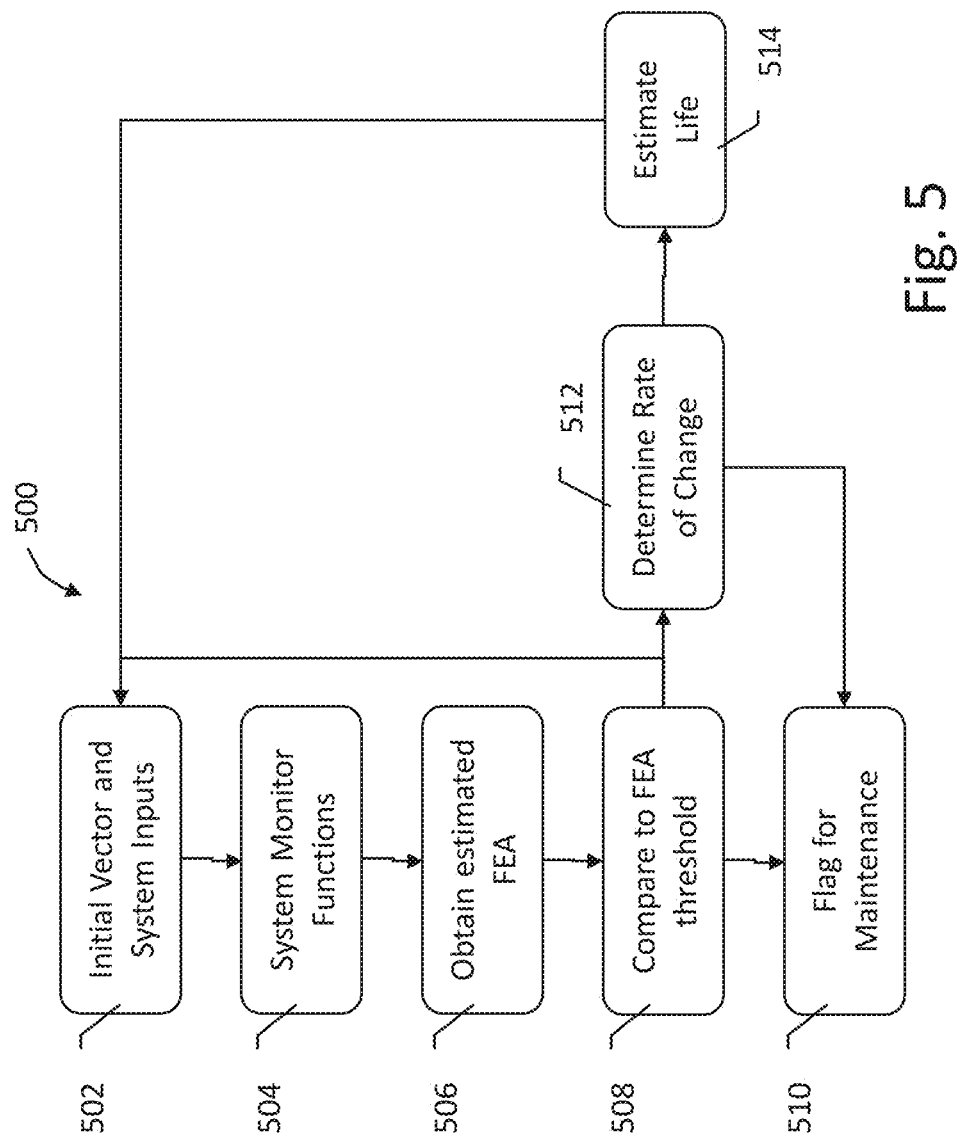
FIGS. 5-8 show illustrative methods in block diagram form.

FIG. 5 shows a first example application of the methods and systems disclosed herein. The method 500 includes configuration of the initial vector and system inputs at 502. Step 502 may include, for example, obtaining and/or entering information regarding the system components in use, including configuration of the MAF sensors, the EGR Valves, size/volume of the engine intake manifold, the UEGO, and the fuel injectors. The method includes performing system monitor functions during operation of the engine, as indicated at 504. Monitor functions 504 includes obtaining data related to the output of pressure and temperature sensors, the MAF sensor, and settings for the EGR valves and fuel injectors as the engine is operated, as well as inferring and tracking pressure and temperature at various points in the system using a model.

Next, as indicated at 506, the method obtains an estimated FEA, or more than one estimated FEA. The estimated FEA obtained at 506 may be that of an EGR valve, whether high pressure or low pressure, for example. The estimated FEA is then compared to a threshold, as indicated at 508, where the threshold sets a lower bound for the FEA in some examples. The threshold may, for example, require that the estimated FEA indicate no more than some predetermined percentage of available flow area (50%, 60%, 70%, 80%, 90%, 95%, or other value) is blocked. If the threshold is crossed at 508, the system sets a flag for maintenance at 510. Step 510 may simply include storing or updating a value in memory, or may instead annunciate a need for maintenance, such as by illuminating a check engine light or activating another alert to a user. Step 510 may also or instead comprise issuing a communication from the vehicle or system to a central repository for a fleet of vehicles or an OEM database, for example. The maintenance may include, for example, cleaning or replacing one or more components.

If the FEA does not indicate an immediate need for maintenance in block 508, the method can return to block 502 and await a next iteration. For example, the monitor functions in block 504 may be performed at intervals, such as once a second, minute, hour or day, or once or more per trip. In some examples, the system may also determine a rate of change of the FEA, as indicated at block 512. If the rate of change in estimated FEA exceeds another threshold, this may again prompt a flag for maintenance. The rate of change may also be used to estimate remaining useful life for the EGR valve(s), as indicated at 514. The remaining useful life may be reported, either by communication to a central repository, or during a maintenance visit, and may be used to schedule maintenance.

The values stored throughout the process, including the FEA estimates, may also be stored for purposes of troubleshooting. At a maintenance visit, the vehicle system may be electronically polled by coupling to the engine control unit to download diagnostic trouble codes (DTCs) generated during operation. Stored FEA estimates may be used to aid in ruling in, or ruling out, potential root causes for reported DTCs. In addition, if a health monitor is included in the system, the recorded FEA information may be used by the system health monitor to optimize or adjust engine performance and operation, using methods and systems disclosed in U.S. patent application Ser. No. 17/008,076, filed Aug. 31, 2020 and titled HEALTH CONSCIOUS CONTROLLER.

Figure 6:
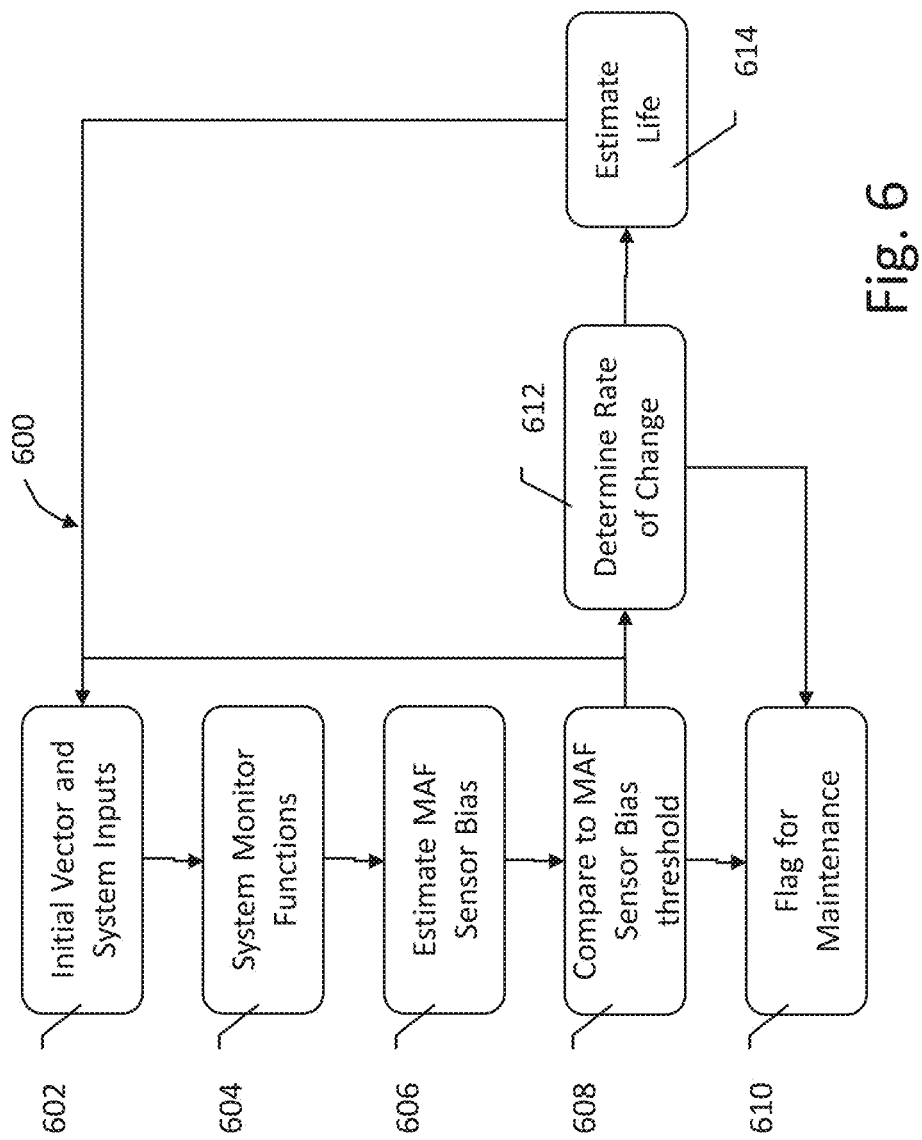

FIG. 6 shows another example application of the methods and systems disclosed herein. The method 600 includes configuration of the initial vector and system inputs at 602. Step 602 may include, for example, obtaining and/or entering information regarding the system components in use, including configuration of the MAF sensors, the EGR Valves, size/volume of the engine intake manifold, the UEGO, and the fuel injectors. The method then performs system monitor functions during operation of the engine, as indicated at 604. System monitor functions 604 includes obtaining data related to the output of pressure and temperature sensors, the MAF sensor, and settings for the EGR valves and fuel injectors as the engine is operated, as well as inferring and tracking pressure and temperature at various points in the system using a model.

Next, as indicated at 606, the method obtains an estimated MAF Sensor Bias. The estimated MAF Sensor Bias obtained at 606 is then compared to a threshold, as indicated at 608, where the threshold sets an upper bound for the MAF Sensor Bias in some examples. The threshold may, for example, require that the estimated MAF Sensor Bias indicate no more than some predetermined amount of change, such as 1% to 30%, or more or less, from nominal or initial calibrated values, or relative to an expected or estimating aging trend (that is, relative to a model for MAF Sensor Bias developed for the MAF Sensor itself to the extent one is available). If the threshold is crossed at 608, the system sets a flag for maintenance at 610. Step 610 may simply include storing or updating a value in memory, or may instead annunciate a need for maintenance, such as by illuminating a check engine light or activating another alert to a user. Step 610 may also or instead comprise issuing a communication from the vehicle or system to a central repository for a fleet of vehicles or an OEM database, for example. The maintenance may include, for example, cleaning or replacing one or more components.

Figure 7:
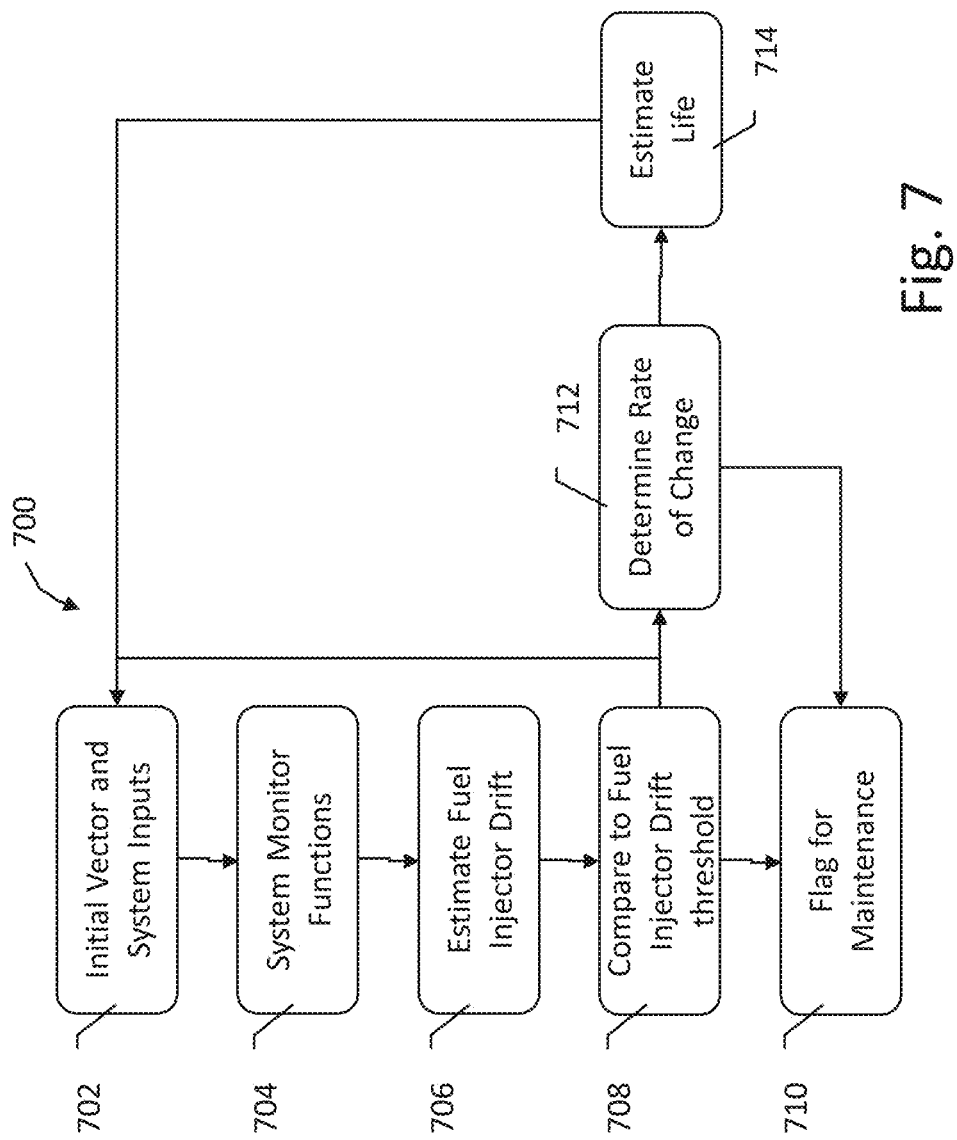

If the MAF Sensor Bias does not indicate an immediate need for maintenance in block 608, the method can return to block 602 and await a next iteration. For example, the monitor functions in block 604 may be performed at intervals, such as once a second, minute, hour or day, or once or more per trip. In some examples, the system may also determine a rate of change of the MAF Sensor Bias as indicated at block 612. If the rate of change in estimated MAF Sensor Bias exceeds another threshold, this may again prompt a flag for maintenance. The rate of change may also be used to estimate remaining useful life for the MAF Sensor, as indicated at 614. The remaining useful life may be reported, either by communication to a central repository, or during a maintenance visit, and may be used to schedule maintenance. FIG. 7 shows another example application of the methods and systems disclosed herein. The method 700 includes configuration of the initial vector and system inputs at 702. Step 702 may include, for example, obtaining and/or entering information regarding the system components in use, including configuration of the MAF sensors, the EGR Valves, size/volume of the engine intake manifold, the UEGO, and the fuel injectors. The method then performs system monitor functions during operation of the engine, as indicated at 704. System monitor functions 704 includes obtaining data related to the output of pressure and temperature sensors, the MAF sensor, and settings for the EGR valves and fuel injectors as the engine is operated as well as inferring and tracking pressure and temperature at various points in the system using a model.

Next, as indicated at 706, the method obtains an estimated Fuel Injector Drift. The estimated Fuel Injector Drift obtained at 706 is then compared to a threshold, as indicated at 608, where the threshold sets an upper bound for the Fuel Injector Drift in some examples. The threshold may, for example, require that the estimated Fuel Injector Drift indicate no more than some predetermined amount of drift, such as 1% to 30%, or more or less, from nominal or initial calibrated values, or relative to a model of degradation/drift for the Fuel Injectors themselves (to the extent such a model is available). If the threshold is crossed at 708, the system sets a flag for maintenance at 710. Step 710 may simply include storing or updating a value in memory, or may instead annunciate a need for maintenance, such as by illuminating a check engine light or activating another alert to a user. Step 710 may also or instead comprise issuing a communication from the vehicle or system to a central repository for a fleet of vehicles or an OEM database, for example. The maintenance may include, for example, cleaning or replacing one or more components.

If the Fuel Injector Drift does not indicate an immediate need for maintenance in block 708, the method can return to block 702 and await a next iteration. For example, the system monitor functions in block 604 may be performed at intervals, such as once a second, minute, hour or day, or once or more per trip. In some examples, the system may also determine a rate of change of the Fuel Injector Drift as indicated at block 612. If the rate of change in estimated Fuel Injector Drift exceeds another threshold, this may again prompt a flag for maintenance. The rate of change may also be used to estimate remaining useful life for the Fuel Injectors, as indicated at 614. The remaining useful life may be reported, either by communication to a central repository, or during a maintenance visit, and may be used to schedule maintenance.

The values stored throughout the processes in FIGS. 5-7, including the FEA estimates, MAF Sensor Bias, and/or fuel injector drift, may also be stored for purposes of troubleshooting. At a maintenance visit, the vehicle system may be electronically polled by coupling to the engine control unit to download diagnostic trouble codes (DTCs) generated during operation. Stored FEA estimates, MAF Sensor Bias, and/or fuel injector drift may be used to aid in ruling in, or ruling out, potential root causes for reported DTCs. In addition, if a health monitor is included in the system, the recorded FEA, MAF Sensor Bias, and/or fuel injector drift information may be used by the system health monitor to optimize or adjust engine performance and operation, using methods and systems disclosed in U.S. patent application Ser. No. 17/008,076, filed Aug. 31, 2020 and titled HEALTH CONSCIOUS CONTROLLER.

In some examples, the calculation of MAF Sensor Bias, Fuel Injector Drift, and/or HP or LP EGR FEA, is performed with the engine system fully operational. Such examples are in contrast with alternatives in which the engine, or one or more components of the engine, are disabled. For example, U.S. Pat. No. 10,641,214 discloses an approach to diagnosing an EGR status, such as identifying a clogged valve, by forcing air through the EGR valve with the engine off, and/or U.S. Pat. No. 10,184,439, in which fuel injector performance is determined by disabling fuel injectors one at a time during engine idling. In other examples, one or more engine features may be disabled or otherwise modified from ordinary operation, or may be operated in a controlled state, while performing any of the above described analyses.

Figure 8:
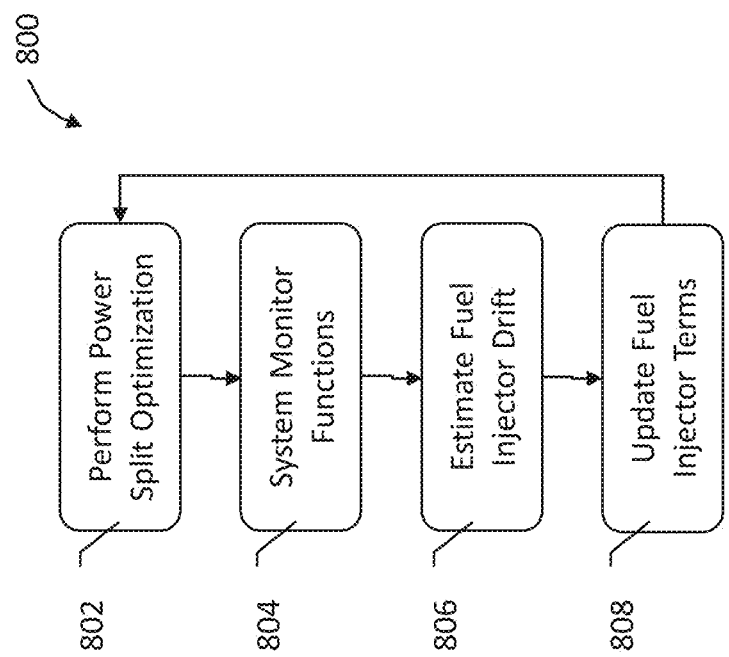

FIG. 8 shows an example in the context of a hybrid vehicle which combines electric drive with a fuel-based drive. Optimization is used in hybrid vehicle engine control to maximize fuel efficiency. As the vehicle ages, and particularly as the fuel injectors age, the optimization models either become less accurate or must be updated using, for example, an assumed or modeled fuel injector drift. In an illustrative implementation, however, the calculated fuel injector drift can be applied, thereby enhancing the optimization routine. In the example of FIG. 8, power split optimization is performed at block 802. During operation of the internal combustion engine, system monitor functions are performed at 804 (similar to blocks 504, 604, and 704 described above), and the above methods are used to estimate fuel injector drift at 806. The estimated fuel injector drift is then used to update one or more terms related to the fuel injector operation in the power split optimization calculation as indicated at 808. For example, current fuel consumption, accumulated fuel consumption, and/or the fuel consumption map may be updated. The result is an enhanced approach to the power split optimization.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. In this document, the terms "a" or "an" are used, as is common in patent documents, to include one or more than one, independent of any other instances or usages of "at least one" or "one or more." Moreover, in the claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, innovative subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the protection should be determined with reference to the appended claims, along with the full scope of equivalents to which such claims are entitled.

What is claimed is:

1. A system comprising:
   an engine comprising at least one cylinder, at least one fuel injector, an intake manifold and an exhaust manifold, wherein the at least one fuel injector is configured to inject a quantity of fuel to the cylinder, subject to fuel injector drift;
   an air intake comprising a mass air flow (MAF) sensor having an inlet and an outlet that generates a MAF sensor output subject to MAF sensor bias;
   a fuel-air mix (FAM) sensor having a FAM sensor output;
   a throttle positioned between the air intake and the engine intake manifold;
   an ambient pressure sensor and an ambient temperature sensor each having an output;
   an intake manifold (IM) pressure sensor and an IM temperature sensor configured to sense pressure and temperature respectively at the intake manifold;
   a system monitor configured to calculate each of the following using a model and the ambient pressure sensor and ambient temperature sensor outputs:
      a first pressure and a first temperature downstream of the MAF sensor;
      a second pressure and a second temperature at the exhaust manifold;
      a third pressure and a third temperature at the FAM sensor;
   a controller configured to calculate each of fuel injector drift and MAF sensor bias using the IM pressure and IM temperature, the MAF sensor output, the FAM sensor output, the fuel injector output, the first, second and third pressures, and the first, second, and third temperatures.

2. The system of claim 1 further comprising a turbocharger having a turbine coupled to receive exhaust gas from the exhaust manifold and a compressor coupled to provide compressed air to the throttle; wherein the system monitor is configured to calculate the first pressure and first temperature upstream of the compressor.

3. The system of claim 1 wherein the controller is further configured to:
　record a plurality of calculated fuel injector drift values,
　determine a rate of change of the fuel injector drift, and
　estimate and record a percentage of useful life remaining for the fuel injector.

4. The system of claim 1 wherein the controller is further configured to:
　compare the calculated fuel injector drift to a threshold, and
　if the threshold is met, issue an alert for maintenance of the fuel injector.

5. The system of claim 1 wherein the controller is further configured to:
　record a plurality of MAF sensor bias values,
　determine a rate of change of the MAF sensor bias, and
　estimate and record a percentage of useful life remaining for the MAF sensor.

6. The system of claim 1 wherein the controller is further configured to:
　compare the calculated MAF sensor bias to a threshold, and
　if the threshold is met, issue an alert for maintenance of the MAF sensor.

7. The system of claim 1 further comprising an exhaust gas recirculation (EGR) valve configured to recirculate air from the exhaust manifold back to the intake manifold, the EGR valve selectively operable between open and closed positions and subject to reduction of flow area (FEA), wherein the controller is further configured to estimate the FEA of the EGR valve using the IM pressure and IM temperature, the MAF sensor output, the FAM sensor output, the fuel injector output, the first, second and third pressures, and the first, second, and third temperatures.

8. The system of claim 7 wherein the controller is further configured to:
　record a plurality of estimated FEA values,
　determine a rate of change of the FEA, and
　estimate and record a percentage of useful life remaining for the EGR valve.

9. The system of claim 7 wherein the controller is further configured to:
　compare the estimated FEA to a threshold, and
　if the threshold is met, issue an alert for maintenance of the EGR valve.

10. A hybrid electric vehicle comprising the system of claim 1 and an electric motor, wherein the electric motor is controlled using a hybrid power split optimization routine, wherein the vehicle is configured to update the hybrid power split optimization routine using the estimated fuel injector drift.

11. A method of operation in an engine system:
　wherein the engine system includes:
　　an engine having at least one cylinder, at least one fuel injector, an intake manifold and an exhaust manifold, wherein the at least one fuel injector is configured to inject a quantity of fuel to the cylinder, subject to fuel injector drift;
　　an air intake comprising a mass air flow (MAF) sensor having an inlet and an outlet that generates a MAF sensor output subject to MAF sensor bias;
　　a fuel-air mix (FAM) sensor having a FAM sensor output;
　　a throttle positioned between the air intake and the engine intake manifold;
　　an ambient pressure sensor and an ambient temperature sensor each having an output;
　　an intake manifold (IM) pressure sensor and an IM temperature sensor configured to sense pressure and temperature respectively at the intake manifold;
　wherein the method of operation comprises:
　calculating each of the following using a model and the ambient pressure sensor and ambient temperature sensor outputs:
　　a first pressure and a first temperature downstream of the MAF sensor;
　　a second pressure and a second temperature at the exhaust manifold;
　　a third pressure and a third temperature at the FAM sensor; and
　a controller calculating each of fuel injector drift and MAF sensor bias using the IM pressure and IM temperature, the MAF sensor output, the FAM sensor output, the fuel injector output, the first, second and third pressures, and the first, second, and third temperatures.

12. The method of claim 11 wherein the engine system also includes a turbocharger having a turbine coupled to receive exhaust gas from the exhaust manifold and a compressor coupled to provide compressed air to the throttle; wherein the method further comprises calculating the first pressure and first temperature upstream of the compressor.

13. The method of claim 11 further comprising:
　the controller recording a plurality of calculated fuel injector drift values,
　the controller determining a rate of change of the fuel injector drift, and
　the controller estimating and recording a percentage of useful life remaining for the fuel injector.

14. The method of claim 11 further comprising:
　the controller comparing the calculated fuel injector drift to a threshold, and
　if the threshold is met, the controller issuing an alert for maintenance of the fuel injector.

15. The method of claim 11 further comprising:
　the controller recording a plurality of MAF sensor bias values,
　the controller determining a rate of change of the MAF sensor bias, and
　the controller estimating and recording a percentage of useful life remaining for the MAF sensor.

16. The method of claim 11 further comprising:
　the controller comparing the calculated MAF sensor bias to a threshold, and
　if the threshold is met, the controller issuing an alert for maintenance of the MAF sensor.

17. The method of claim 11, wherein the system also includes an exhaust gas recirculation (EGR) valve configured to recirculate air from the exhaust manifold back to the intake manifold, the EGR valve selectively operable between open and closed positions and subject to reduction of flow area (FEA), the method further comprising:
　the controller estimating the FEA of the EGR valve using the IM pressure and IM temperature, the MAF sensor output, the FAM sensor output, the fuel injector output, the first, second and third pressures, and the first, second, and third temperatures.

18. The method of claim 17 further comprising:
　the controller recording a plurality of estimated FEA values,
　the controller determining a rate of change of the FEA, and
　the controller estimating and recording a percentage of useful life remaining for the EGR valve.

19. The method of claim 17 further comprising:
the controller comparing the estimated FEA to a threshold, and
if the threshold is met, the controller issuing an alert for maintenance of the EGR valve.

20. The method of claim 11, wherein the engine system is included in a hybrid electric vehicle including an electric motor operable along with the engine, wherein the electric motor and engine are controlled using a hybrid power split optimization routine, and the method further comprises the controller updating the hybrid power split optimization routine using the estimated fuel injector drift.

* * * * *